United States Patent
Nadkarni et al.

(10) Patent No.: US 6,823,279 B1
(45) Date of Patent: Nov. 23, 2004

(54) SPECTRAL METHOD FOR CALIBRATING A MULTI-AXIS ACCELEROMETER DEVICE

(75) Inventors: Vivek B. Nadkarni, Sunnyvale, CA (US); Philip Winslow, Hayward, CA (US)

(73) Assignee: Trimble Navigation Limted, Sunnyvale, CA (US)

( * ) Notice: Subject to any disclaimer, the term of this patent is extended or adjusted under 35 U.S.C. 154(b) by 0 days.

(21) Appl. No.: 09/917,437

(22) Filed: Jul. 27, 2001

(51) Int. Cl.[7] ............................................. G01P 21/00
(52) U.S. Cl. ............................................................ 702/104
(58) Field of Search ............................... 702/104, 182, 702/41, 95; 73/382, 1, 102, 151, 504, 432, 178; 244/3, 170; 166/252, 252.4; 701/221; 33/304; 318/567; 273/187

(56) References Cited

U.S. PATENT DOCUMENTS

| | | | | |
|---|---|---|---|---|
| 4,318,300 A | * | 3/1982 | Maughmer | 73/178 R |
| 4,461,088 A | * | 7/1984 | Van Steenwyk | 33/304 |
| 4,696,112 A | * | 9/1987 | Hoffman | 33/304 |
| 4,956,921 A | * | 9/1990 | Coles | 33/304 |
| 5,372,365 A | * | 12/1994 | McTeigue et al. | 273/187 |
| 5,435,168 A | * | 7/1995 | Granere | 73/1 |
| 5,922,951 A | * | 7/1999 | O'Keefe et al. | 73/382 |
| 6,152,226 A | * | 11/2000 | Talwani et al. | 166/252.4 |
| 6,421,622 B1 | * | 7/2002 | Horton et al. | 702/95 |
| 6,545,440 B2 | * | 4/2003 | Slater et al. | 318/567 |

* cited by examiner

Primary Examiner—John Barlow
Assistant Examiner—Tung Lau

(57) ABSTRACT

A method for simultaneously determining respective scale factors and alignment angles of a multi-axis accelerometer device for measuring acceleration. To measure the scale factors, the multi-axis accelerometer device to be calibrated is mounted on a turntable. The turntable has a tilt angle with respect to a vertical axis defined by the local gravity vector. The turntable is used to spin the multi-axis accelerometer device around an axis of rotation at an angular velocity such that the multiple sensitive axes of the accelerometer device experience a time varying component of the local gravity vector. The respective outputs of the multiple sensitive axes of the accelerometer device are recorded as the device experiences the time varying component of the local gravity vector. The multi-axis accelerometer device is mounted on the turntable in two more orthogonal orientations, and the rotation and data recording procedure is repeated. The angular velocity can be constant during the logging. Additionally, the predicted output of an ideal accelerometer on the turntable is generated, wherein the predicted output is based on the tilt angle of the turntable and the angular velocity of the turntable and on the value of gravitational acceleration at the location of calibration. The data recorded with the accelerometer device mounted in the three orientations are combined with the predicted output, to obtain the scale factors and alignment angles of the multi-axis accelerometer device.

19 Claims, 8 Drawing Sheets

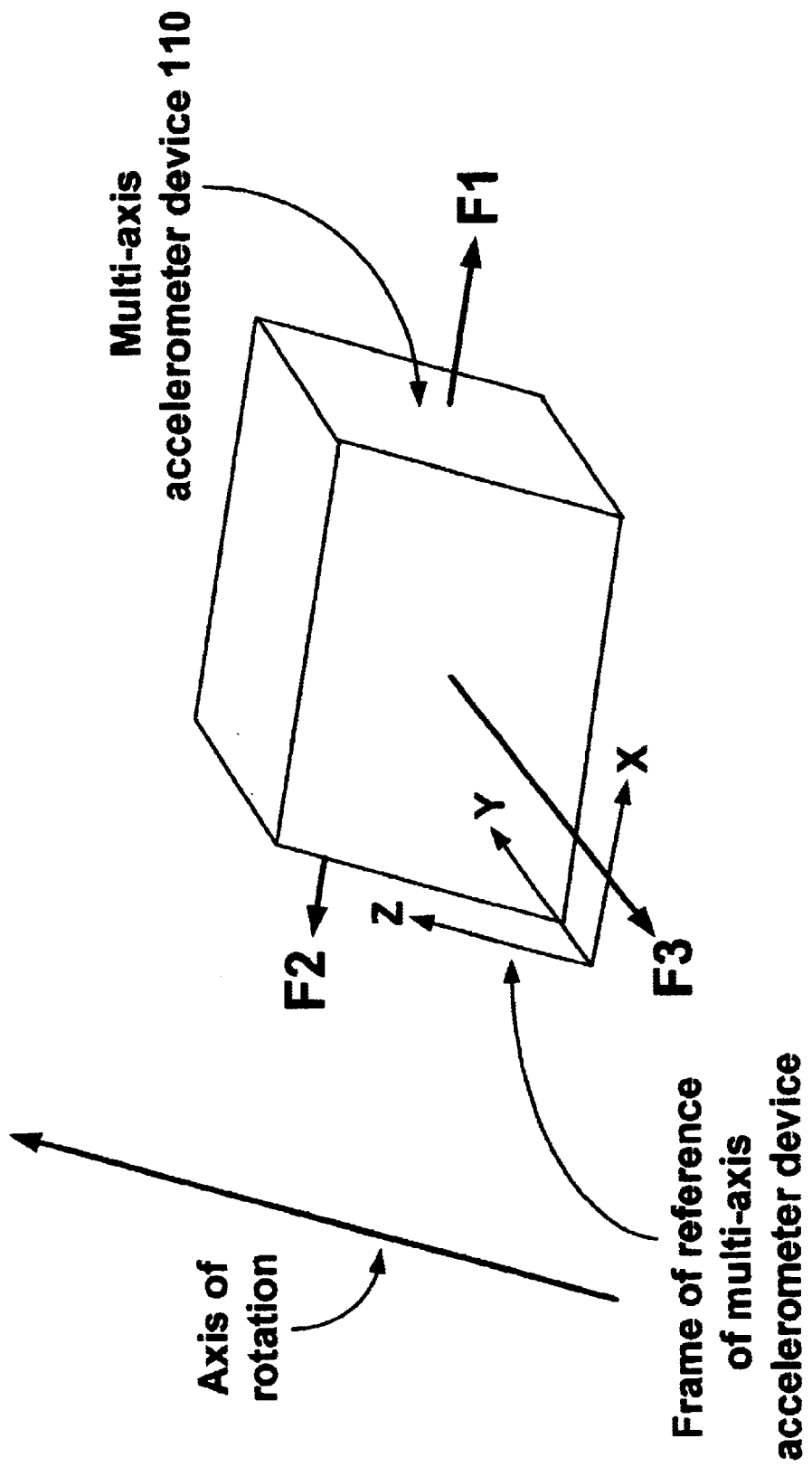
FIG. 1C: Orientation A

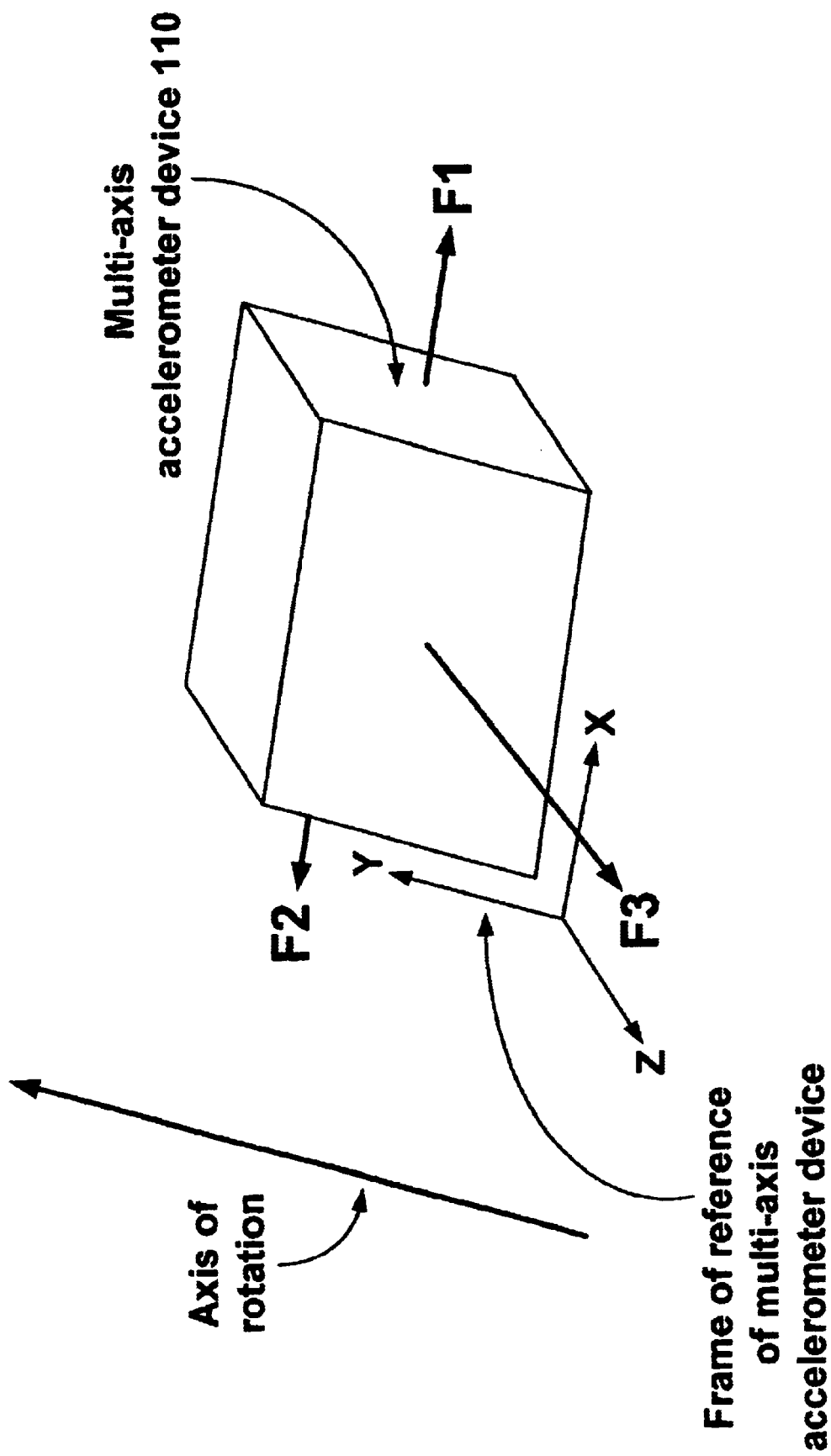
FIG. 1D: Orientation B

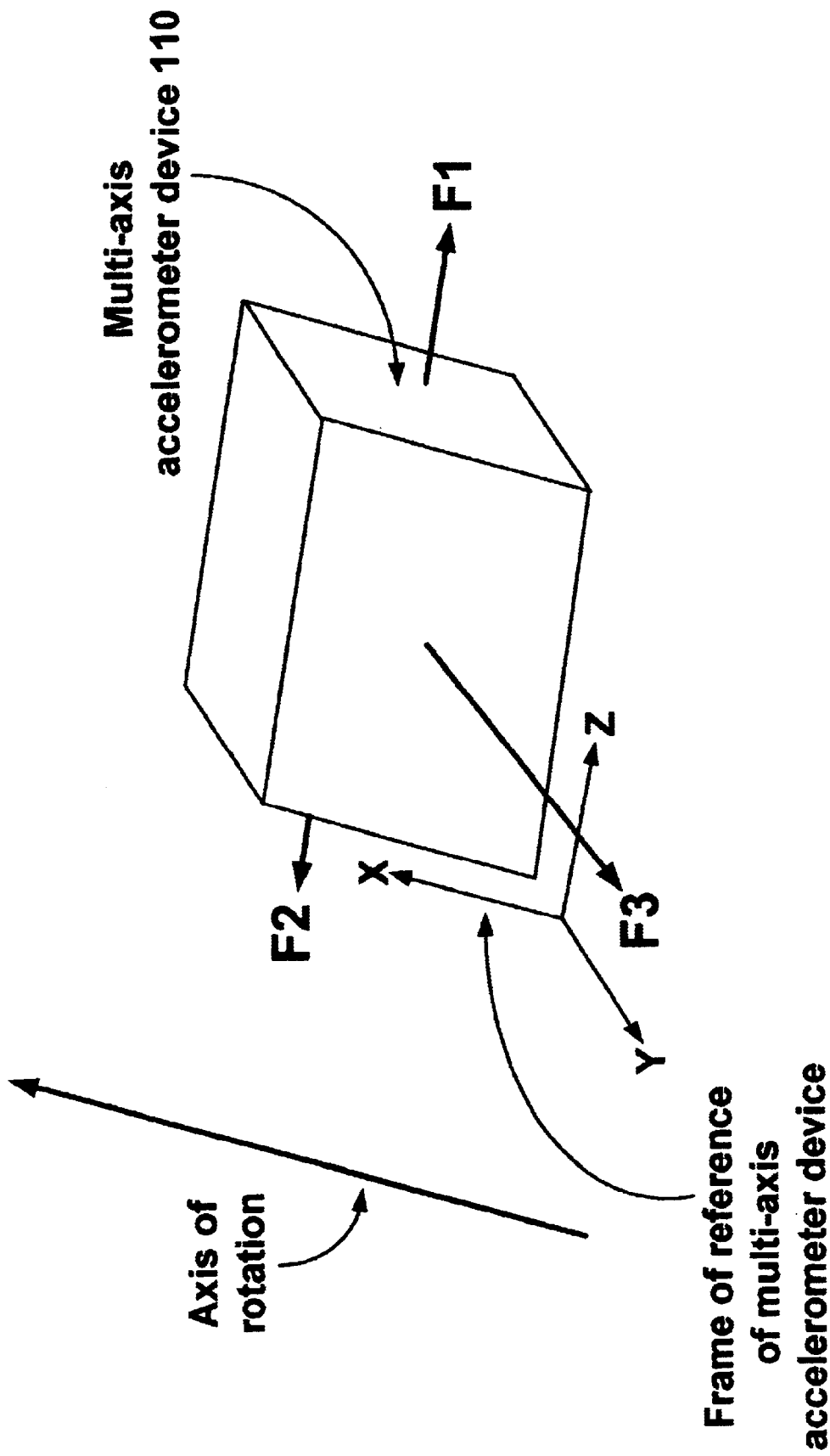
FIG. 1E: Orientation C

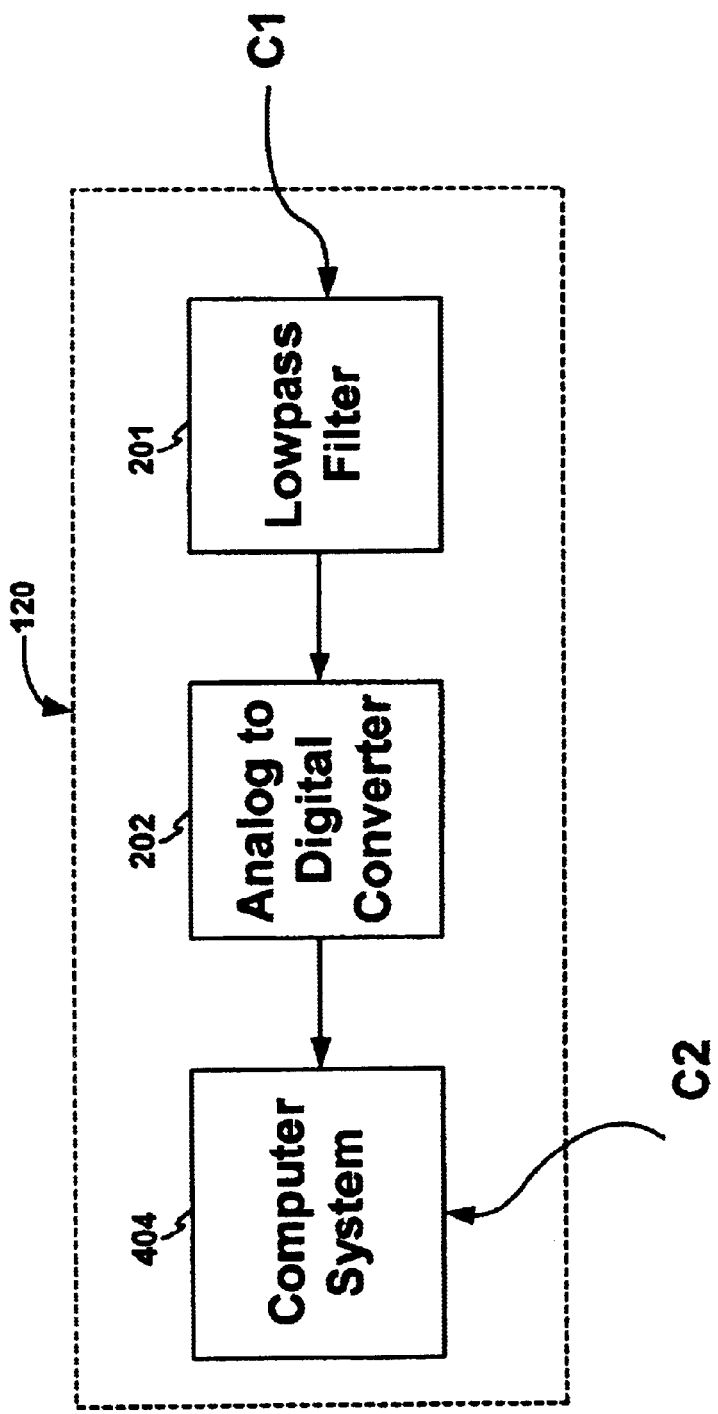
FIG. 2: Multi-Function Processor System

SPECTRAL METHOD FOR CALIBRATING A MULTI-AXIS ACCELEROMETER DEVICE This application is related to copending application "A SPECTRAL METHOD FOR CALIBRATING ACCELEROMETERS" by Nadkarni et al., filed on Jul. 27, 2001, Ser. No. 09917501, which is incorporated herein by reference.

TECHNICAL FIELD

The present invention relates generally to methods and systems for the a, precise calibration of instruments. More specifically, the present invention pertains to an accurate and efficient process for calibrating accelerometers.

BACKGROUND ART

An accelerometer is a transducer used for measuring acceleration. Acceleration is usually measured at a measurement point in the accelerometer, along a sensitive axis of the accelerometer. Generally, the magnitude of an applied acceleration is communicatively coupled to external instruments or circuits as an electrical impulse having amplitude proportional to the magnitude of the applied acceleration. The electrical impulse comprises the measured acceleration and is processed by the external circuits as required for a variety of applications. One such application is, for example, an Inertial Measurement Unit (IMU), where acceleration measurements are used to generate velocity and positioning information.

The electrical impulse output of an accelerometer is proportional to the acceleration, applied at the measurement point along the sensitive axis of the accelerometer. The process of calibrating an accelerometer consists of computing a constant of proportionality, referred to as a scale factor of the accelerometer. The scale factor of an accelerometer precisely relates the amplitude of the electrical impulses comprising the measured acceleration to the magnitude of a corresponding acceleration applied at the measurement point, along the sensitive axis of the accelerometer.

A multi-axis accelerometer device can measure acceleration along multiple sensitive axes. This can be a combination of one or more accelerometers, with one or more axes of sensitivity each, and a common frame of reference with respect to which each of these accelerometers and their respective measurement points and sensitive axes remains fixed at all times. The frame of reference of the multi-axis accelerometer device is the coordinate system in which the acceleration sensed by the array is measured. The frame of reference of the array is typically an orthogonal frame of reference.

The process of calibrating a multi-axis accelerometer device consists of computing the scale factors for each of the multiple sensitive axes in the device, and furthermore computing the alignment angles of the sensitive axes in the device with respect to a frame of reference of the device. One measure of the alignment angles of a sensitive axis of the device is the direction cosine vector or alignment vector of this sensitive axis of the accelerolmeter device with respect to the orthogonal frame of reference of the array. The alignment vector of a sensitive axis of the multi-axis accelerometer device is the unit vector in the direction of the sensitive axis of the device. For optimal precision of measurement using the multi-axis accelerometer device, it is desirable to calibrate the multi-axis accelerometer device by precisely determining the scale factors and alignment angles corresponding to each individual sensitive axis of the device.

Prior art systems for calibrating accelerometers (e.g., measuring and defining the scale factor) relied on comparisons of the accelerometers to certain standard devices. Such prior art systems necessarily assume that the standard devices themselves are properly calibrated, often leading to the introduction of additional error into the calibration process. For example, one prior art system (see prior art U.S. Pat. No. 5,970,779) requires the use of precisely controlled swing arm motor systems to which the accelerometer being tested is mounted, along with an appropriate counter weight. The swing arm motor would be precisely controlled by a processor to impart a simple harmonic motion acceleration to the sensitive axis of the accelerometer, and vary this acceleration by varying the angular acceleration of the swing arm. The resulting output of the accelerometer would be examined with respect to the controlled varying of the swing arm motor, and the scale factor would be determined therefrom.

One problem with the above prior art approach is that it requires a precisely controllable motor for varying the angular velocity of the accelerometer. The motor needs to precisely apply a simple harmonic acceleration to the accelerometer by varying the angular velocity about an axis of rotation. As described above, this system requires the proper calibration of the standard devices themselves (e.g., the motor), which often leads to additional error in the calibration of the accelerometer.

A second, more important drawback of the above prior art approach is that it requires measuring the radius of rotation of the accelerometer. This distance can be very difficult to measure accurately, since the measurement point of the accelerometer is internal to the accelerometer. Any error in this measurement will manifest itself in through a flawed calibration.

Thus, what is required is a solution that accurately measures and determines the scale factor and alignment angles of each of the multiple sensitive axes in the device simultaneously. What is required is a solution that calibrates the multi-axis accelerometer device without introducing unnecessary sources of error. The required solution should be precise and avoid reliance on standard devices, which can introduce error into the calibration process. The required solution should not rely on any time varying control of a standard device to impart variable acceleration. The required solution should not rely on measurements of distance to points internal to the accelerometer. The present invention provides a novel solution to the above requirements.

DISCLOSURE OF THE INVENTION

The present invention provides a solution that accurately measures and determines the scale factor and alignment angles of multiple sensitive axes of a multi-axis accelerometer device simultaneously. The present invention provides a solution that calibrates a multi-axis accelerometer device without introducing unnecessary sources of error. The solution of the present invention is precise and avoids reliance on standard devices, which can introduce error into the calibration process. The solution of the present invention does not rely on any time varying control of a standard device to impart variable acceleration.

In one embodiment, the present invention is Implemented as a spectral method for simultaneously determining respective scale factors and alignment vectors of a multi-axis accelerometer device for measuring acceleration. The scale factors and alignment angles are determined simultaneously in one process, allowing the calibration of the multiple axes of the multi-axis accelerometer device in one process. To measure the scale factors and alignment angles, the multi-axis accelerometer device to be calibrated is mounted on a turntable. The turntable has a tilt angle with respect to a vertical axis defined by the local gravity vector. The turntable is used to spin the multi-axis accelerometer device around an axis of rotation at an angular velocity such that each sensitive axis of the device experiences a time varying component of the local gravity vector (e.g., due to the tilt angle). The respective outputs of the multiple sensitive axes of the multi-axis accelerometer device are logged as each sensitive axis in the array experiences the time varying component of the local gravity vector. This process is repeated with the multi-axis accelerometer device placed in each of three orthogonal orientations along the axes of the frame of reference of the array (e.g. the orthogonal X, Y and Z axes of the frame of reference).

The scale factors and alignment vectors of the sensitive axes of the multi-axis accelerometer device are determined by combining the recorded outputs of the multiple sensitive axes of the device mathematically with the a predicted output of an ideal accelerometer (e.g., a sine wave). Herein, the predicted output is based on the tilt angle, the angular velocity of the ideal accelerometer and on gravitational acceleration. This combination is performed after the multi-axis accelerometer device has been placed on the turntable in each of three orthogonal orientations along the axes of the frame of reference of the device. In so doing, the present invention accurately measures and determines the scale factor and alignment angles of the sensitive axes of the device, without relying on any time varying control of a standard device (e.g., stepper motor, etc.) to impart variable acceleration to the multi-axis accelerometer device. It also does not rely on a measurement of the radius about which the multi-axis accelerometer device rotates, and thereby, does not rely on a precise knowledge of the location of measurement point of the device internal to the device.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 1C shows a diagram of the device in Orientation 1, in which the Z-axis of the frame of reference of the device is pointing along the axis of rotation of the turntable.

FIG. 1D shows a diagram of the device in Orientation 1, in which the Y-axis of the frame of reference of the device is pointing along the axis of rotation of the turntable.

FIG. 1E shows a diagram of the device in Orientation 1, in which the X-axis of the frame of reference of the device is pointing along the axis of rotation of the turntable.

FIG. 2 shows the components of the multifunction processor in accordance with one embodiment of the present invention.

DETAILED DESCRIPTION OF THE INVENTION

Figure 1A:
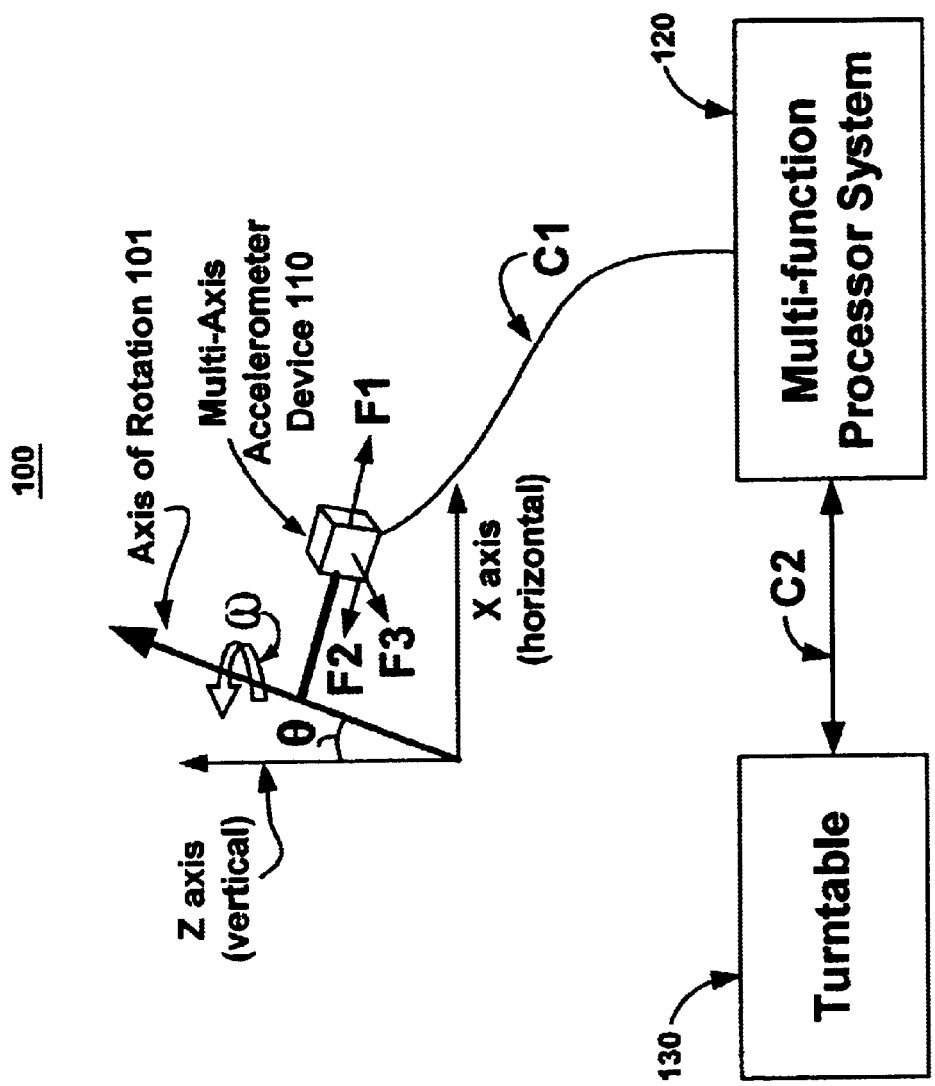
FIG. 1A shows a multi-axis accelerometer device calibration system in accordance with one embodiment of the present invention.

Reference will now be made in detail to the embodiments of the invention, a spectral method for calibrating a multi-axis accelerometer device, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail as not to unnecessarily obscure aspects of the present invention.

The present invention provides a solution that accurately measures and determines the scale factor and alignment angles of each of the multiple sensitive axes of the accelerometer device. The present invention provides a solution that can calibrate a device having multiple sensitive axes in a single calibration process. The present invention provides a solution that calibrates accelerometer devices without introducing unnecessary sources of error. The solution of the present invention is precise and avoids reliance on standard devices, which can introduce error into the calibration process. The solution of the present invention does not rely on any time varying control of a standard device to impart variable acceleration. The solution of the present invention does not rely on any measurement of distance to a measurement point of the device. The present invention and its benefits are further described below.

Notation and Nomenclature

Some portions of the detailed descriptions, which follow, are presented in terms of procedures, steps, logic blocks, processing, and other symbolic representations of operations on data bits within a computer memory. These descriptions and representations are the means used by those skilled in the data processing arts to convey most effectively the substance of their work to others skilled in the art. A procedure, computer-executed step, logic block, process, etc., are here, and generally, conceived to be self-consistent sequences of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussions, it is appreciated that throughout the present invention, discussions utilizing terms such as "processing," "computing," "configuring,"

"comparing," "determining," "sampling," "transforming," or the like, refer to the action and processes of a computer system (e.g., computer system 404 of FIG. 4), or similar electronic computing device, that manipulates and transforms data represented as physical (electronic) quantities within the computer system's registers and memories into other data similarly represented as physical quantities within the computer system registers or memories or other such information storage, transmission, or display devices.

Embodiment of the Invention

Referring now to FIG. 1A, a multi-axis accelerometer device calibration system 100 in accordance with one embodiment of the present invention is shown. As depicted in FIG. 1A, the calibration system 100 utilizes a turntable 130 and a multifunction processor system 120 to calibrate the output of a multi-axis accelerometer device 110. The multi-axis accelerometer device 110 is mounted on turntable 130 in one of three orientations, shown in FIG. 1C, 1D and 1E, and described below. The axis of rotation of turntable 130 is tilted with respect to a vertical Z axis by an angle θ. The Z axis is precisely vertical, parallel to the local gravity vector, g. During the calibration process, the turntable rotates multi-axis accelerometer device 110 about the axis of rotation at an angular velocity ω. It should be noted that the Z axis depicted in FIG. 1A refers to the vertical axis, parallel to the local gravity vector, as opposed to any Z axis of the multi-axis accelerometer device 110.

The rotation of the turntable about the axis of rotation at the constant angular velocity ω gives rise to three forces acting on the multi-axis accelerometer device 110, shown as F1, F2 and F3. F2 is a centripetal force of constant magnitude acting on the multi-axis accelerometer device. The gravitational acceleration, not shown in the figure, felt by the multi-axis accelerometer device in the plane of the turntable is $g*\sin(\theta)$. Decomposing this acceleration along the radius of rotation and tangential to the radius of rotation gives us forces F1 and F3. F1 is a time varying force with amplitude $g*\sin(\theta)*\cos(\phi(t))$ acting radially on the multi-axis accelerometer device, and F3 is a time varying force with amplitude $g*\sin(\theta)*\sin(\phi(t))$, acting tangentially on the multi-axis accelerometer device. Here θ is the angle of tilt of the axis of rotation from the vertical (e.g., the Z axis), as shown in FIG. 1A. φ is the angle subtended at the axis of rotation by the frame of reference of the multi-axis accelerometer device 110 and the component of gravity in the plane of rotation of the accelerometer 110. φ is a function of time t. g is the acceleration due to gravity. The angular velocity $\omega = d\phi/dt$. Specifically, $\phi(t) = \omega*t + \phi(0)$, where $\phi(0)$ is the value of the angle φ at time t=0, which is when data logging begins.

Figure 1B:
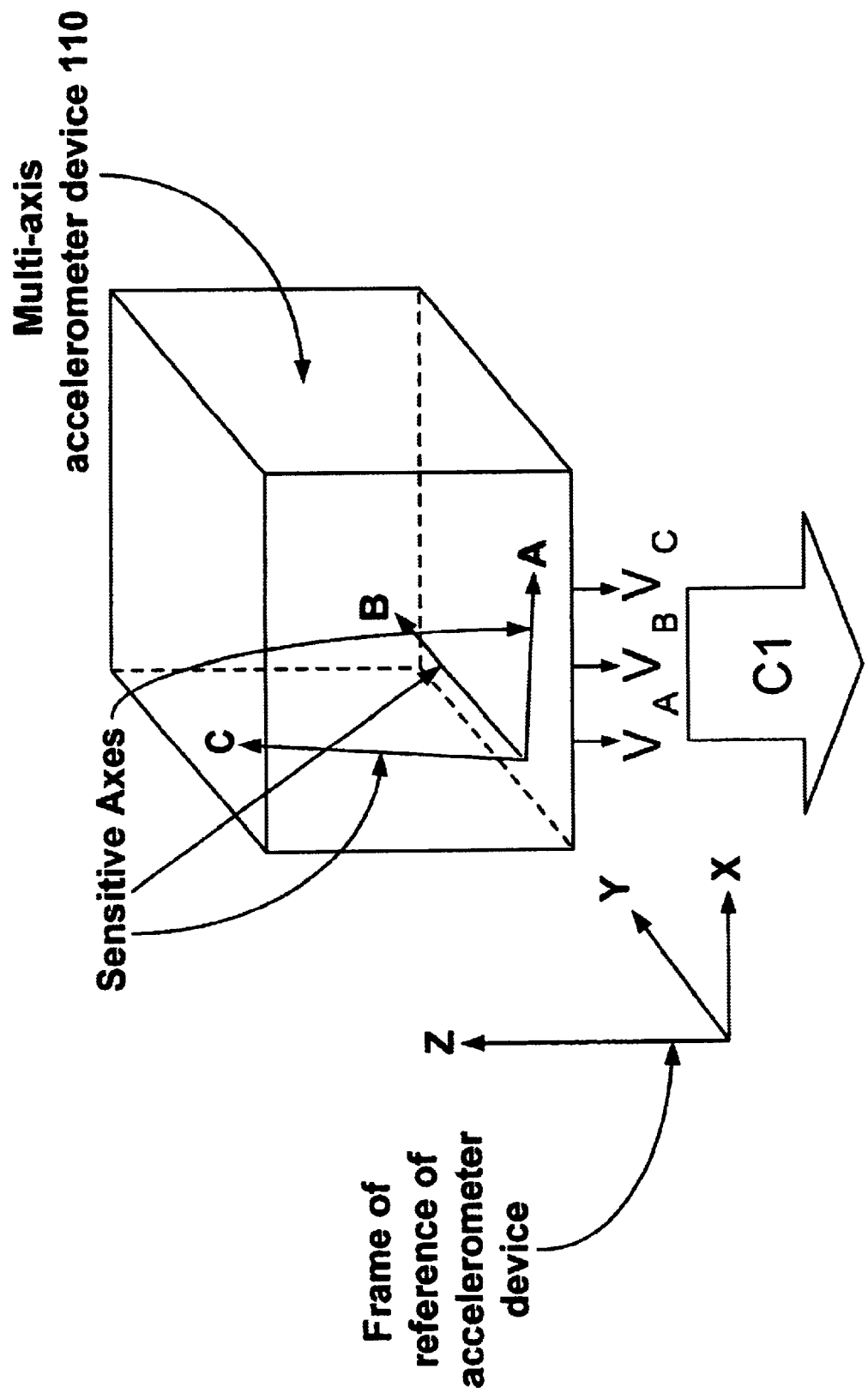
FIG. 1B shows a diagram of 3 sensitive axes (e.g. A, B and C) of the multi-axis accelerometer device from FIG. 1A, along with the frame of reference (e.g. axes X, Y and Z) of the multi-axis accelerometer device.

Referring now to FIG. 1B, the multi-axis accelerometer device in this embodiment consists of three accelerometers A, B and C, which are oriented in a fixed orientation with respect to each other. Typically, these, accelerometers A, B and C are nominally mutually orthogonal. Any mounting error present is compensated for when the alignment angles of the accelerometer are computed. Additionally, the multi-axis accelerometer device has an orthogonal frame of reference with respect to which it measures acceleration. Each of the accelerometers A, B and C are also oriented in a fixed orientation with respect to this orthogonal frame of reference. Typically, the axes of the orthogonal frame of reference of the multi-axis accelerometer device (e.g. X, Y and Z axes of the device) nominally coincide with the sensitive axes of the three accelerometers. Thus, accelerometer A is aligned to point in the X direction of the multi-axis accelerometer device, but is not perfectly aligned. Similarly, accelerometer B and C are aligned, but not perfectly, to respectively point along the Y and Z axes of the orthogonal frame of reference of the multi-axis accelerometer device 110. It is necessary to determine the alignment angles of the accelerometers, because the accelerometers A, B and C are not perfectly aligned with the orthogonal frame of reference of the multi-axis accelerometer device.

Referring again to FIG. 1B, the multi-axis accelerometer device 110 is shown with its multiple sensitive axes (e.g., along the arrows A, B and C) which are the sensitive axes of the individual accelerometers (e.g., accelerometers A, B and C) in the device. As shown in FIG. 1B, the multi-axis accelerometer device 110 includes three sensitive axes of measurement. The multiple axes are nominally mutually orthogonal, and are used to provide acceleration measurements, and position derived therefrom, in 3D space. Each axis has its corresponding output, shown as $V_A$, $V_B$ and $V_C$. In the present embodiment, the outputs convey the measured acceleration as voltage signals. A connector C1 couples these output voltages $V_A$, $V_B$ and $V_C$ from the multi-axis accelerometer device 110 to the multifunction processor 120 as depicted in FIG. 1A. In this embodiment, a connector C2 connects the multifunction processor system 120 to turntable 130 to receive information regarding the angular velocity ω.

Referring now to FIGS. 1C, 1D and 1E, these figures show the multi-axis accelerometer device positioned in each of three orientations. In Orientation 1, shown in FIG. 1C, the Z-axis of the multi-axis accelerometer device is parallel to the Axis of Rotation of the turntable, and the X-axis of the multi-axis accelerometer device is aligned radially, pointing along the direction of force F1. In Orientation 2, shown in FIG. 1D, the Y-axis of the multi-axis accelerometer device is parallel to the Axis of Rotation of the turntable, and the X-axis of the multi-axis accelerometer device is aligned radially, pointing along the direction of force F1. In Orientation 3, shown in FIG. 1E, the X-axis of the multi-axis accelerometer device is parallel to the Axis of Rotation of the turntable, and the Z-axis of the multi-axis accelerometer device is aligned radially, pointing along the direction of force F1.

To perform the calibration, the multi-axis accelerometer device is positioned in Orientation 1, and rotated on the turntable. In this orientation $\phi(t)=\omega*t+\omega_1$ where $\omega_1$ is the value of the angle ω at time t=0, which is when data logging begins in Orientation 1. The voltages of each of the three accelerometers in the device are logged, while the turntable is rotating. This is repeated with the multi-axis accelerometer device in Orientations 2 and 3. Thus for Orientation 2, $\phi(t)=\omega*t+\omega_2$, where $\omega_2$ is the value of the angle φ at time when data logging begins in Orientation 2 and similarly the equation for orientation 3 is $\phi(t)=\omega*t+\phi_3$, where $\phi_3$ is the value of the angle φ at time data logging begins for Orientation 3.

In Orientation 1, the voltage output, denoted $V_{A,1}$, of the accelerometer A in multi-axis accelerometer device 110 (e.g., corresponding to the acceleration measured by accelerometer A) is equal to the sum of the accelerations due to forces F1, F2 and F3 acting on accelerometer A. The acceleration due to force F1 on accelerometer A is $\alpha_A*g*\sin(\theta)*A_x*\cos(\phi(t))$, where $\alpha_A$ is the scale factor of the accelerometer A in multi-axis accelerometer device 110, and $[A_x, A_y, A_z]$ is the alignment vector of accelerometer A in the frame of reference of the multi-axis accelerometer device 110. Similarly, the acceleration due to force F3 on accelerometer A is $\alpha_A*g*\sin(\theta)*A_y*\sin(\phi(t))$. We denote the constant acceleration acting on accelerometer A (e.g., due to the constant force F2, and due to the constant component of gravitational acceleration parallel to the axis of rotation) by the constant $K_{A,1}$. Thus, $$V_{A,1}=\alpha_A{}^*g^*\sin(\theta)^*\{A_x{}^*\cos(\phi(t))+A_y{}^*\sin(\phi(t))\}+K_{A,1}$$

Using similar notation for the other two accelerometers, we have $$V_{B,1}=\alpha_A{}^*g^*\sin(\theta)^*\{B_x{}^*\cos(\phi(t))+B_y{}^*\sin(\phi(t))\}+K_{B,1}$$

$$V_{C,1}=\alpha_A{}^*g^*\sin(\theta)^*\{C_x{}^*\cos(\phi(t))+C_y{}^*\sin(\phi(t))\}+K_{C,1}$$

Similarly, for Orientation 2, shown in FIG. 1D, we have:

$$V_{A,2}=\alpha_A{}^*g^*\sin(\theta)^*\{A_x{}^*\cos(\phi(t))+A_y{}^*\sin(\phi(t))\}+K_{A,2}$$

$$V_{B,2}=\alpha_A{}^*g^*\sin(\theta)^*\{B_x{}^*\cos(\phi(t))+B_y{}^*\sin(\phi(t))\}+K_{B,2}$$

$$V_{C,2}=\alpha_A{}^*g^*\sin(\theta)^*\{C_x{}^*\cos(\phi(t))+C_y{}^*\sin(\phi(t))\}+K_{C,2}$$

Also, for Orientation 3, shown in FIG. 1E, we have:

$$V_{A,3}=\alpha_A{}^*g^*\sin(\theta)^*\{A_x{}^*\cos(\phi(t))+A_y{}^*\sin(\phi(t))\}+K_{A,3}$$

$$V_{B,3}=\alpha_A{}^*g^*\sin(\theta)^*\{B_x{}^*\cos(\phi(t))+B_y{}^*\sin(\phi(t))\}+K_{B,3}$$

$$V_{C,3}=\alpha_A{}^*g^*\sin(\theta)^*\{C_x{}^*\cos(\phi(t))+C_y{}^*\sin(\phi(t))\}+K_{C,3}$$

Referring now to FIG. 2, the components of the multifunction processor 120 in accordance with one embodiment of the present invention are shown. For clarity, the single input C1 is shown, however it should be understood that the signal C1 is comprised of the output signals of the multiple accelerometers $V_A$, $V_B$ and $V_C$ as depicted in FIG. 1B.

In Orientation 1, the multifunction processor 120 first uses a low pass filter 201 to filter the voltage outputs (e.g., $V_{A,1}$, $V_{B,1}$, $V_{C,1}$) the multiple axis of accelerometer 110. An analog to digital converter 202 converts the filtered signals received from low pass filter 201 into digital form. This process of low pass filtering and then performing the analog to digital conversion on the signals is referred to as sampling. The number of times a second the sampling is performed is referred to as the sampling frequency ($f_s$). Low pass filter 201 is designed to block all signals that have a frequency greater than a certain frequency, referred to as the cutoff frequency of the low pass filter, but to let through, or pass, all signals that have a frequency lower than the cutoff frequency. In the present embodiment, low pass filter 201 has a cutoff frequency that is lower than $f_s/2$.

The computer system 404 then logs this sampled data. This logging is performed for a period of time longer than that required for multiple complete revolutions of the axis of rotation. Computer system 404 then takes a Discrete Fourier Transform (DFT) of each of the logged voltage outputs from accelerometers A, B and C. Similar low pass filtering, analog too digital conversion, data collection, and subsequent Discrete Fourier Transform is performed with the accelerometer in each of the three orientations depicted in FIGS. 1C, 1D and 1E.

Consider the accelerometer A, in Orientation 1. The voltage on accelerometer A is given by:

$$V_{A,1}=\alpha_A{}^*g^*\sin(\theta)^*\{A_x{}^*\cos(\phi(t))+A_y{}^*\sin(\phi(t))\}+K_{A,1}.$$

In the Fourier domain, all the energy in constant force F2 and the constant component of gravitational acceleration parallel to the axis of rotation, corresponding to the constant term $K_{A,1}$, is seen around zero frequency. Also, all the energy in the time varying forces F1 and F3, corresponding to the terms $\alpha_A{}^*g^*\sin(\theta)^*A_x{}^*\cos(\phi(t))$ and $\alpha_A{}^*g^*\sin(\theta)^*A_y{}^*\cos(\phi(t))$ respectively, is seen concentrated in the discrete DFT bins corresponding to the frequency ω. This can be seen as a peak in the DFT at the bins corresponding to the frequency ω. Since the DFT is a linear operation, the amplitude of the DFT at the frequency co is proportional to $\alpha_A{}^*g^*\sin(\theta)$. Where the peak value of the DFT at the frequency 107 is referred to as $P_{A,1}$, the following equation holds true:

$$P_{A,1}=\kappa^*\alpha_A{}^*g^*\sin(\theta)^*\exp(i^*\phi_1)^*(A_x-i^*A_y)$$

In this equation, κ is a constant of proportionality obtained during the process of taking the DFIC of the signal $V_{A,1}$. Similarly, the equations from the other two accelerometers in Orientation 1 are:

$$P_{B,1}=\kappa^*\alpha_B{}^*g^*\sin(\theta)^*\exp(i^*\phi_1)^*(B_x-i^*B_y)$$

$$P_{C,1}=\kappa^*\alpha_C{}^*g^*\sin(\theta)^*\exp(i^*\phi_1)^*(C_x-i^*C_y)$$

Using this same process the equations for the peak DFT values for Orientations 2 are:

$$P_{A,2}=\kappa^*\alpha_A{}^*g^*\sin(\theta)^*\exp(i^*\phi_2)^*(A_x+i^*A_z)$$

$$P_{B,2}=\kappa^*\alpha_B{}^*g^*\sin(\theta)^*\exp(i^*\phi_2)^*(B_x+i^*B_z)$$

$$P_{C,2}=\kappa^*\alpha_C{}^*g^*\sin(\theta)^*\exp(i^*\phi_2)^*(C_x+i^*C_z)$$

Similarly, the equations for the peak DFT values for Orientations 3 are:

$$P_{A,3}=\kappa^*\alpha_A{}^*g^*\sin(\theta)^*\exp(i^*\phi_3)^*(A_z+i^*A_y)$$

$$P_{B,3}=\kappa^*\alpha_B{}^*g^*\sin(\theta)^*\exp(i^*\phi_3)^*(B_z+i^*B_y)$$

$$P_{C,3}=\kappa^*\alpha_C{}^*g^*\sin(\theta)^*\exp(i^*\phi_3)^*(C_z+i^*C_y)$$

The computer system 404 also generates a sampled version of a sine wave internally, of amplitude α_nominal* g_nominal* sin(θ_measured)* cos(φ(t)). This sine wave comprises the predicted output of the accelerometer 110. Here α_nominal is the expected scale factor of the accelerometer, g_nominal is the value of earth's gravitational acceleration at the point the accelerometer measurements are being taken, θ_measured is the measured tilt of the axis of rotation, and φ(t) is a monotonically increasing function with constant derivative (ω). Computer system 404 takes the DFT of this sampled sine wave. The energy in this sampled sine wave can also be seen in the DFT as a peak in the DFT bins corresponding to the frequency of the sine wave.

The energy in this sampled sine wave is also seen as a peak of this DFT at the bins corresponding to the frequency ω. Again, since the DFT is a linear operation, the amplitude of the DFT at the frequency ω is proportional to α_nominal*g_nominal*sin(θ_measured). Where the peak value of this DFT is referred to as P_nominal, the following equation holds true:

$$P\_nominal=\kappa^*\alpha\_nominal^*g\_nominal^*\sin(\theta\_measured)$$

where κ is the same constant of proportionality found in calculating $P_{A,1}$.

The tilt angle ζ is measured using an accurate tilt sensor. Therefore, θ_measured=θ. Also, g_nominal=9.80665 m/s²=the approximate acceleration due to gravity. The errors in measuring the tilt angle and gravity are negligible in comparison to the required accuracy of the scale factor and alignment computation, and hence, these errors are ignored.

Using this equation for P_nominal and the equations for the peak DFT values we can solve for the scale factors $\alpha_A$, $\alpha_B$, and $\alpha_A$ and further solve for the alignment vectors [$A_x$, $A_y$, $A_z$], [$B_x$, $B_y$, $B_z$] and [$A_x$, $A_y$, $A_z$]. One method to solve these equations is shown in Appendix A.

Additionally, variations of this method, requiring fewer orientations of the multi-axis accelerometer device, can be implemented. For example, variations can be made if some information about the device is known prior to taking the calibration measurements, or if lower accuracy is required in the calibration.

One example of a variation is the following. If one of the sensitive axes of the device is known to lie in the X-Y plane in the frame of reference of the device, then the alignment angles and the scale factors for this sensitive can be computed using data recorded only in orientations 1 and 2.

Another example of a variation, is the case in which one of the sensitive axes lies nominally in the X direction of the frame of reference of the device, and the accuracy requirements on the sensor are lower. Then, a similar procedure can be performed using only Orientation 1, using a combination of Orientation 1 and Orientation 2, or a combination of all three Orientations. The errors in the scale factor and alignment angles of the sensitive axis become smaller, in this example, as more orientations are used for the calibration.

Both of these variations can be solved as approximations to, or special cases of, the general solutions described in Appendix A.

Figure 3:
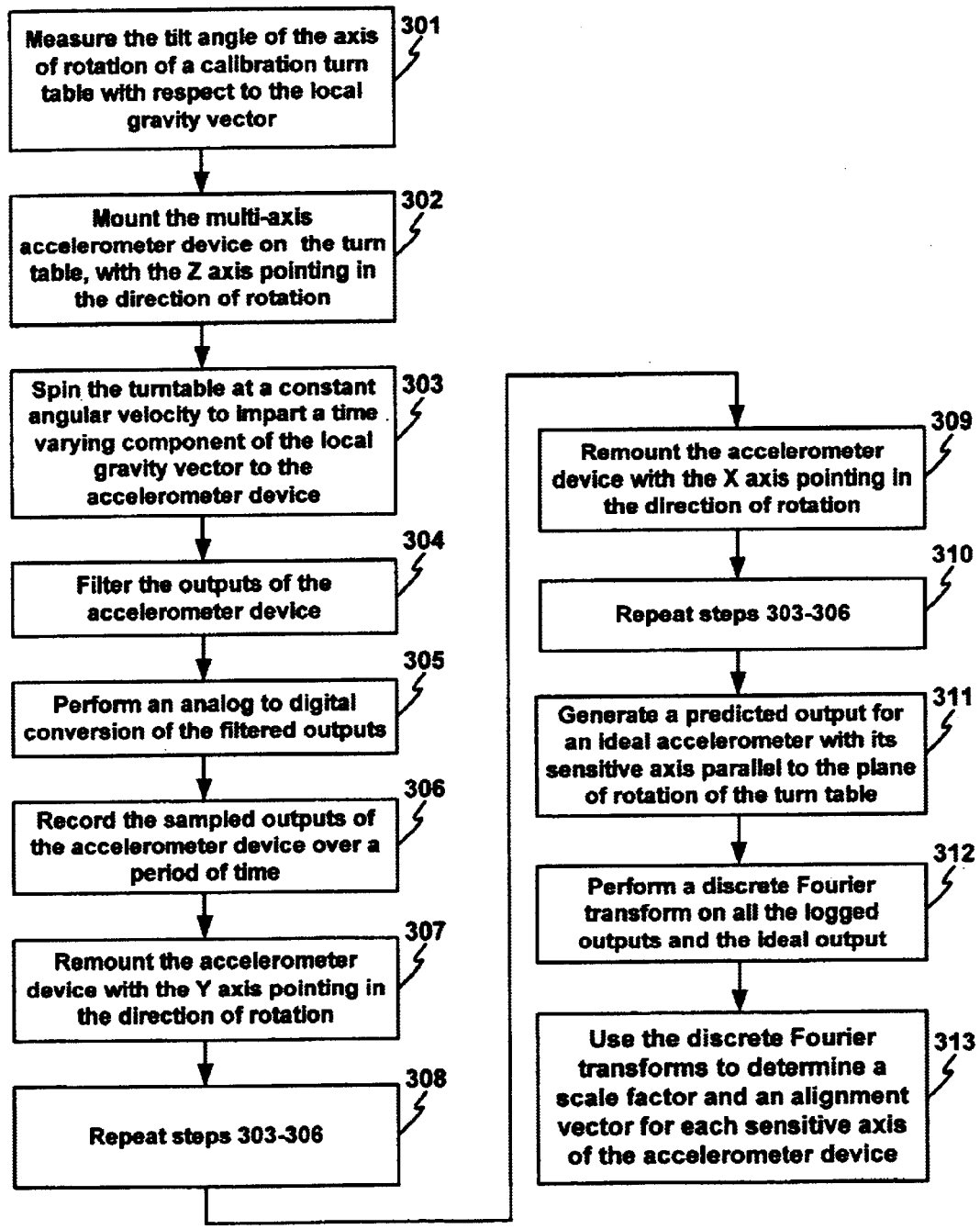
FIG. 3 shows a flowchart of the steps of an accelerometer calibration process in accordance with one embodiment of the present invention.

Referring now to FIG. 3, a flowchart showing the steps of a process 300 in accordance with one embodiment of the present invention is shown. As depicted in FIG. 3, process 300 shows the operating steps of the calibration system (e.g., system 100 of FIG. 1A) calibrating a multiple axis multi-axis accelerometer device (e.g., multi-axis accelerometer device 110).

Process 300 begins in step 301, in which a tilt angle of the turntable mechanism, on which the calibration of the accelerometer device is to be performed, with respect to the local gravity vector is measured. As described above, this tilt angle (e.g., θ) describes a difference between an axis of rotation of the turntable and the local gravity vector (e.g., the vertical axis). In step 302, the multi-axis accelerometer device to be calibrated is mounted on the turntable mechanism. The mounting is performed such that the Z-axis of the multi-axis accelerometer device is pointing along the axis of rotation. In step 303, the turntable is spun around the axis of rotation at an annular velocity ω. As described above, the rotation gives rise to three forces acting on the accelerometer; a centripetal force F2 of constant magnitude acting on the accelerometer, and time varying forces F1 and F3 due to components of the local gravity vector. The constant component of gravitational acceleration, acting along the axis of rotation, also acts on the accelerometer, and is not shown in the figure. A component of F1 and F3 is simultaneously experienced by each accelerometer (e.g., A, B and C) of multi-axis accelerometer device 110. In step 304, the $V_A$, $V_B$ and $V_C$ outputs of the accelerometer device are filtered using a low pass filter. In step 305, the filtered outputs of the accelerometer device are processed through an analog to digital converter yielding respective sampled outputs of the accelerometer. In step 306, the sampled outputs of the accelerometer device are logged as the accelerometers A, B and C of the multi-axis accelerometer device experience the time varying components F1 and F3.

Referring still to process 300 of FIG. 3, in step 307, the multi-axis accelerometer device is detached from the turntable and remounted such that the Y axis of the device is pointing along the axis of rotation. In step 308, steps 303 to 306 are repeated with the multi-axis accelerometer device in this new orientation.

In step 309, the multi-axis accelerometer device is detached from the turntable and remounted such that the X-axis of the multi-axis accelerometer device is pointing along the axis of rotation. In step 310, steps 303 to 306 are repeated with the multi-axis accelerometer device in this new orentation.

In step 311, a predicted output of an ideal accelerometer parallel to the plane of rotation of the turntable is generated. In step 312, discrete Fourier transforms are performed on all of the logged accelerometer outputs and the predicted output of the ideal accelerometer. Hence, in step 313, the discrete Fourier transforms of each the logged outputs along with the predicted output of the ideal accelerometer are used together to determine the scale factors and alignment vectors of each of the accelerometers of the multi-axis accelerometer device.

In so doing, the turntable mechanism of the present invention accurately measures and determines the scale factors and alignment vectors of the multiple axis accelerometer device without relying on any time varying control of a standard device (e.g., stepper motor, etc.) to impart variable acceleration to the accelerometer. Furthermore, it determines these scale factors and alignment vectors without the knowledge of the distance to any measurement point of the multi-axis accelerometer device from any other point.

Thus, the present invention provides a solution that accurately measures and determines the scale factor and alignment vector of each accelerometer in a multiple axis multi-axis accelerometer device simultaneously. The present invention provides a solution that can calibrate a device having multiple sensitive accelerometer axes in a single calibration process. The present invention provides a solution that calibrates multi-axis accelerometer devices without introducing unnecessary sources of error. The solution of the present invention is precise and avoids reliance on standard devices, which can introduce error into the calibration process. The solution of the present invention does not rely on any time varying control of a standard device to impart variable acceleration. Furthermore the solution of the present invention does not rely on a precise measurement of the distance to any measurement point multi-axis accelerometer device from any other point.

Computer System Environment

Figure 4:
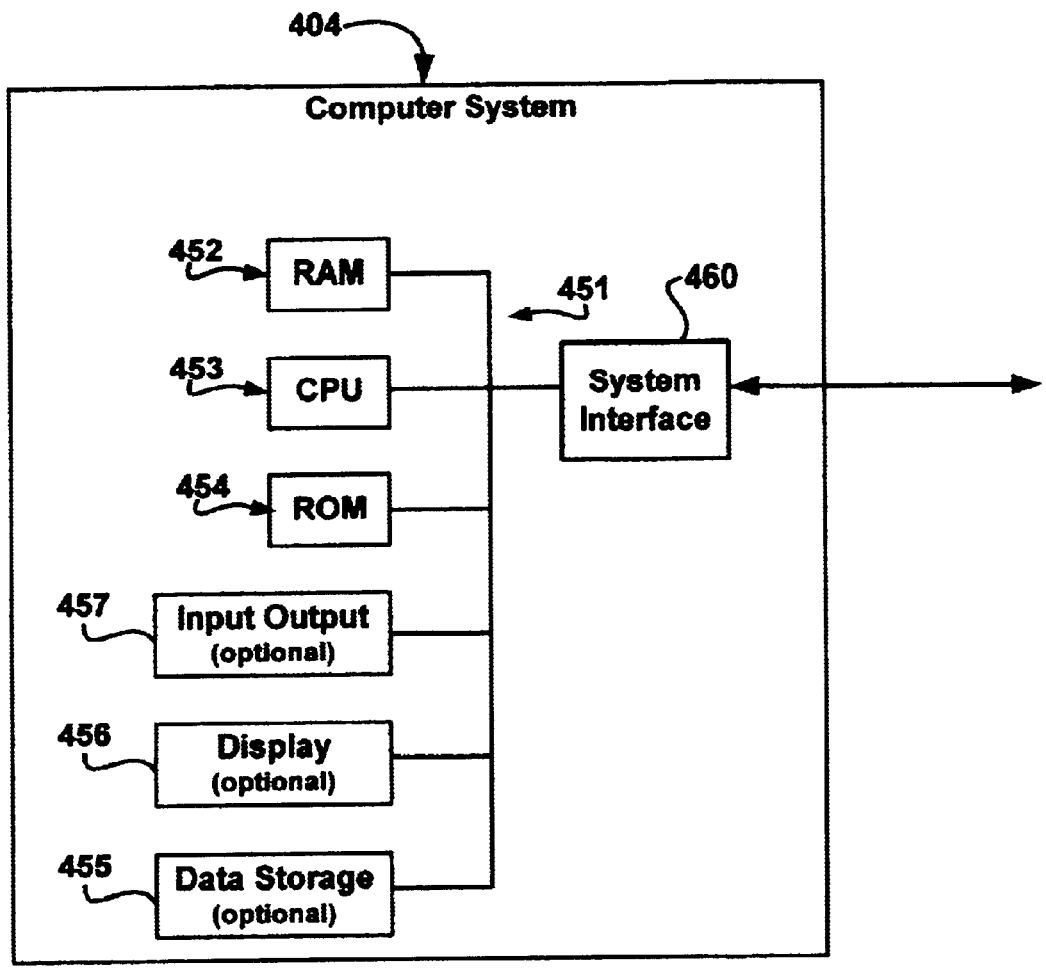
FIG. 4 shows a diagram of the basic components of a computer system in accordance with one embodiment of the present invention.

FIG. 4 shows a diagram of the basic components of computer system 404. Within the above discussions of the present invention, certain processes and steps are discussed that are realized, in one embodiment, as a series of instructions (e.g., software program) that reside within computer readable memory units of computer system 404 and executed by the processor(s) of system 404. When executed, the instructions cause the computer system 404 to perform specific actions and exhibit specific behavior, which was described in detail above.

In general, computer system 404, used by the present invention, comprises an address/data bus 451 for communicating information, one or more central processors 453 coupled with bus 451 for processing information and instructions, a computer readable volatile memory unit 452 (e.g., random access memory, static RAM, dynamic RAM, etc.) coupled with bus 451 for storing information and instructions for central processor(s) 453, a computer readable non-volatile memory unit 454 (e.g., read only memory, programmable ROM, flash memory, EPROM, EEPROM, etc.) coupled with bus 451 for storing static information and instructions for central processor(s) 453. Computer system 404 interfaces with the other components of system 100 via system interface 460. System 404 can optionally include a mass storage computer readable data storage device 455, such as a magnetic or optical disk and disk drive coupled with bus 451, for storing information and instructions, a display 456 for displaying information to the computer user, and an input output device 457 including, for example, alphanumeric and function keys for communicating information and command selections, cursor control inputs, command selections, etc.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order best to explain the principles of the invention and its practical application, thereby to enable others skilled in the art best to utilize the invention and various embodiments with various modifications as are suited to the particular use contemplated. It is intended that the scope of the invention be defined by the Claims appended hereto and their equivalents.

What is claimed is:

1. A method for simultaneously determining respective scale factors or alignment angles of sensitive axes in a multi-axis accelerometer device for measuring acceleration, comprising the steps of:
   a) mounting a multi-axis accelerometer device on a turntable in a first orientation, the turntable having a tilt angle with respect to a vertical axis defined by a local gravity vector;
   b) spinning a multi-axis accelerometer device around an axis of rotation at an angular velocity using the turn table such that the multi-axis accelerometer device experiences a time varying component of the local gravity vector;
   c) receiving respective outputs of the multiple axis as the multi-axis accelerometer device experiences the time varying component of the local gravity vector;
   d) repeating steps (a), (b) and (c) with the multi-axis accelerometer device mounted in a second orientation; and,
   e) repeating steps (a), (b) and (c) with the multi-axis accelerometer device mounted in a third orientation; and,
   f) determining respective scale factors or alignment angles of the multiple axes of the multi-axis accelerometer device, wherein respective Fourier transforms of the respective received outputs of the accelerometer device a combined with Fourier transforms of the predicted outputs of an ideal accelerometer, the predicted outputs based on the tilt angle of the turntable, the angular velocity of the ideal accelerometer, and the local gravity vector.

2. The method of claim 1 wherein the angular velocity is constant during the receiving.

3. The method of claim 1 wherein the multiple-axis accelerometer device is oriented in three orientations while recording data.

4. The method of claim 1 wherein the time varying components of the local gravity vector are equal to $g^*\sin(\theta)^*\cos(\phi(t))$ and $g^*\sin(\theta)^*\sin(\phi(t))$, where $\theta$ is the tilt angle, g is the acceleration due to gravity, and $\phi$ is an angle subtended at the axis of rotation by the accelerometer and the component of gravity in the plane of rotation of the accelerometer.

5. The method of claim 1 further including the step of filtering the outputs of the multiple axis using respective low pass filters.

6. The method of claim 5 further including the step of sampling the low pass filtered outputs of the multiple axis using respective analog to digital converters.

7. The method of claim 6 further including the step of receiving the sampled outputs of the multiple axis and combining the sampled received outputs of the multiple axis with one or more predicted outputs to determine the scale factors of the sensitive axes.

8. The method of claim 6 further including the step of receiving the sampled outputs of the multiple axis and combining the sampled received outputs of the multiple axis with one or more predicted outputs to determine the alignment angles of the sensitive axes.

9. The method of claim 1 further including the steps of:
   taking respective Fourier transforms of the received outputs of the multiple axis;
   taking the Fourier transform of the predicted outputs of an ideal accelerometer; and
   combining the respective Fourier transforms of the received outputs and the predicted output to determine the scale factors or alignment angles of the multiple axis of the multi-axis accelerometer device.

10. A system for simultaneously determining respective scale factors or alignment angles of a multi-axis accelerometer device for measuring acceleration, comprising:
    a turn table mechanism configured to mount an accelerometer device having multiple axis for calibration, the turntable having a tilt angle with respect to a vertical axis defined by a local gravity vector, the turntable configured to spin the accelerometer device around an axis of rotation at an angular velocity such that the accelerometer device experiences time varying components of the local gravity vector; and
    a processor system coupled to receive respective outputs of the multiple sensitive axes of the accelerometer device, the processor system configured to record the outputs of the accelerometer device as the device experiences the time varying components of the local gravity vector and to determine respective scale factors or alignment angles of the multiple axis of the accelerometer device by combining respective Fourier transforms of the logged outputs of the accelerometer device with a Fourier transform of the predicted output of an ideal accelerometer, the predicted output based on the tilt angle of the turntable, the angular velocity of the ideal accelerometer and the local gravity vector.

11. The system of claim 10 wherein the turntable is configured to maintain a constant angular velocity during the recording.

12. The system of claim 10 wherein the time varying components of the local gravity vector are equal to $g^*\sin(\theta)^*\cos(\phi(t))$ and $g^*\sin(\theta)^*\sin(\phi(t))$, where $\theta$ is the tilt angle, g is the acceleration due to gravity, and $\phi$ is an angle subtended at the axis of rotation by the accelerometer and the component of gravity in the plane of rotation of the accelerometer device.

13. The system of claim 10 further including a low pass filter for filtering the outputs of the accelerometer device.

14. The system of claim 13 further including an analog to digital converter for sampling the low pass filtered outputs of the accelerometer device.

15. The system of claim 14, wherein the processor system is further configured to determine the scale factors or alignment angles of the accelerometer device by recording the sampled outputs of the accelerometer device, and by combining the sampled, recorded outputs of the accelerometer device with the predicted output of an ideal accelerometer.

16. The system of claim 15 wherein the processor system is further configured to determine the scale factors and/or alignment angles of the accelerometer device by;

taking respective Fourier transforms of the recorded outputs of the multiple sensitive axes;

taking the Fourier transform of the predicted outputs of an ideal accelerometer; and combining the respective Fourier transforms of the recorded outputs and the predicted output to determine the scale factors or alignment angles of the multiple sensitive axes of the multi-axis accelerometer device.

17. A method for simultaneously determining respective scale factors or alignment angles of sensitive axes in a multi-axis accelerometer device for measuring acceleration, comprising the steps of:

a) mounting a multi-axis accelerometer device on a turntable in a first orientation, the turntable having a tilt angle with respect to a vertical axis defined by a local gravity vector;

b) spinning a multi-axis accelerometer device around an axis of rotation at an angular velocity using the turn table such that the multi-axis accelerometer device experiences a time varying component of the local gravity vector;

c) receiving respective outputs of the multiple axis as the multi-axis accelerometer device experiences the time varying components of the local gravity vector and performing respective Fourier transforms thereupon;

d) determining respective scale factors or alignment angles of the multiple axes of the accelerometer device by combining the Fourier transforms of the respective received outputs of the accelerometer device with a Fourier transform of the predicted outputs of an ideal accelerometer, the predicted outputs based on the tilt angle of the turntable, the angular velocity of the ideal accelerometer, and the local gravity vector.

18. The method of claim 17 further including the step of repeating steps (a), (b) and (c) with the multi-axis accelerometer device mounted in a second orientation.

19. The method of claim 18 further including the step of repeating steps (a), (b) and (c) with the multi-axis accelerometer device mounted in a third orientation.

* * * * *